(12) United States Patent
Bennett et al.

(10) Patent No.: US 9,796,114 B2
(45) Date of Patent: Oct. 24, 2017

(54) DEVICE AND METHOD FOR CUTTING A STONE BLOCK

(71) Applicants: Bryce Bennett, Bedford, IN (US); Gregory K. Smoot, Bedford, IN (US)

(72) Inventors: Bryce Bennett, Bedford, IN (US); Gregory K. Smoot, Bedford, IN (US)

(73) Assignee: DIAMOND STONE TECHNOLOGIES INC., Bedford, IN (US)

( * ) Notice: Subject to any disclaimer, the term of this patent is extended or adjusted under 35 U.S.C. 154(b) by 208 days.

(21) Appl. No.: 14/466,965

(22) Filed: Aug. 23, 2014

(65) Prior Publication Data
US 2015/0053196 A1 Feb. 26, 2015

Related U.S. Application Data

(60) Provisional application No. 61/869,366, filed on Aug. 23, 2013.

(51) Int. Cl.
| | | |
|---|---|---|
| *B28D 1/08* | (2006.01) | |
| *B23D 59/04* | (2006.01) | |
| *B23D 61/18* | (2006.01) | |
| *B28D 7/02* | (2006.01) | |
| *B23D 57/00* | (2006.01) | |
| *B28D 1/12* | (2006.01) | |

(52) U.S. Cl.
CPC ........... *B28D 1/086* (2013.01); *B23D 57/003* (2013.01); *B23D 59/04* (2013.01); *B23D 61/18* (2013.01); *B23D 61/185* (2013.01); *B28D 1/08* (2013.01); *B28D 1/124* (2013.01); *B28D 7/02* (2013.01); *Y10T 83/7264* (2015.04)

(58) Field of Classification Search
CPC .............. B23D 57/0007; B23D 57/003; B23D 57/0061; B23D 59/04; B23D 61/18; B23D 61/185; B28D 1/08; B28D 1/086
USPC ..................................... 451/299, 449; 125/21
See application file for complete search history.

(56) References Cited

U.S. PATENT DOCUMENTS

| | | | | |
|---|---|---|---|---|
| 2,362,979 A | * | 11/1944 | Anderson ............ | B23D 55/082 29/76.3 |
| 2,702,538 A | * | 2/1955 | Burkhardt ............ | B23D 57/026 125/21 |
| 4,945,889 A | * | 8/1990 | Fish ....................... | B28D 1/124 125/21 |
| 5,181,503 A | * | 1/1993 | Fish ....................... | B23D 59/04 125/21 |
| 5,359,987 A | * | 11/1994 | Elliott ..................... | B28D 1/08 125/21 |
| 5,735,259 A | * | 4/1998 | Hoerner ................ | B27B 17/025 125/21 |
| 5,749,775 A | | 5/1998 | Fish | |

* cited by examiner

*Primary Examiner* — Eileen Morgan
(74) *Attorney, Agent, or Firm* — Barnes & Thornburg LLP

(57) ABSTRACT

A device for cutting a block of stone that includes a support bar including a monolithic metallic plate, and a number of fluid ports attached to the plate. The device also includes a wear bar that is secured to the monolithic metallic plate and a lower longitudinal slot, and a cutting belt positioned in the lower longitudinal slot of the wear bar and including a downward-facing cutting surface to cut the block of stone. A method of cutting the stone block is also disclosed.

12 Claims, 11 Drawing Sheets

DEVICE AND METHOD FOR CUTTING A STONE BLOCK

This application claims priority to U.S. Patent App. Ser. No. 61/869,366, which was filed on Aug. 23, 2013 and is expressly incorporated herein by reference.

TECHNICAL FIELD

The present disclosure relates generally to cutting machinery, and particularly to devices for cutting stone.

BACKGROUND

A number of devices have been developed to cut stone blocks into smaller slabs for domestic or commercial use. U.S. Pat. No. 5,181,503 discloses one such device. Another device is the Tiger Diamond Belt Saw, which is commercially available from Park Industries, Inc. of St. Cloud, Minn. Each of those devices includes a saw having a continuous cutting belt that is moved upwardly and downwardly relative to the stone block.

A guide assembly may be used to direct the continuous cutting belt along a substantially straight cutting path. The guide assembly may include a support frame and a wear strip or bar that is secured to the frame. In prior art devices, the support frame included multiple pieces that extend the length of the frame and are welded or secured together with screws. Typically, the width of the continuous cutting belt was no less than 0.535 inches, which resulted in the removal of material along a substantially straight cutting path having a width of at least 0.570 to 0.600 inches.

Despite these prior devices, there is still a need to reduce the amount of material removed by the belt during a cutting operation and thereby increase the amount of material remaining after the block is cut into slabs.

SUMMARY

According to one aspect of the disclosure, a device for cutting a block of stone is disclosed. The device includes a platform configured to receive the block of stone, a frame configured to move vertically relative to the platform, and a support bar. The support bar includes a monolithic metallic plate having a first side wall, a second side wall opposite the first side wall, a plurality of bores extending through the first side wall and the second side wall at each end of the monolithic metallic plate, a bottom wall extending between the first side wall and the second side wall, a longitudinal opening defined in the bottom wall of the monolithic metallic plate, and a pair of inner walls extending upwardly from the opening to define a longitudinal channel in the monolithic metallic plate.

The support bar also includes a first fluid port extending outwardly from the first side wall of the monolithic metallic plate. The first fluid port has a passageway connected to the channel. A second fluid port extends outwardly from the second side wall of the monolithic metallic plate and has a passageway connected to the channel.

The device also includes a fastener extending through each bore of the monolithic metallic plate to secure the monolithic metallic plate to the frame, a wear bar having an upper end positioned in the longitudinal channel of the monolithic metallic plate and a lower longitudinal slot, and a cutting belt positioned in the lower longitudinal slot of the wear bar and including a downward-facing cutting surface.

In some embodiments, the longitudinal channel of the monolithic metallic plate may extend from a first end to a second end. The longitudinal channel may have a first depth at the first end and a second depth at a low point between the first end and the second end. The second depth may be less than the first depth. The longitudinal channel may also have a third depth at the second end that is equal to the first depth. In some embodiments, the first depth may be equal to about 2.5 inches and the second depth may be equal to about 1.0 inch.

In some embodiments, the pair of inner walls of the monolithic metallic plate extend upwardly from the longitudinal opening to a first tapered surface extending from the first end of the channel to the low point. The inner walls may also extend from to a second tapered surface extending from the second end of the longitudinal channel to the low point.

The longitudinal channel defined in the monolithic metallic plate may have a length defined between the first end and the second end, and a width defined between the pair of inner walls. The width may be equal to about 0.090 inches along the length of the channel.

In some embodiments, the first end and the second end of the longitudinal channel may be first and second closed ends. The support bar may further include a first steel block and a second steel block secured to the monolithic metallic plate. The first steel block may define the first closed end of the longitudinal channel and the second steel block may define the second closed end of the longitudinal channel.

In some embodiments, the monolithic metallic plate may have a length defined between a first end wall and a second end wall, and a width defined between the first side wall and the second side wall. The width may be equal to about 0.25 inches along the length of the monolithic metallic plate. The bottom wall of the monolithic metallic plate may define a downward-extending arc.

In some embodiments, the length of the monolithic metallic plate may be in a range of 90 inches to 185 inches. In some embodiments, the cutting belt may have a maximum width of about 0.325 inches.

In some embodiments, the first fluid port may include a body extending outwardly from the first side wall to a distal end. The passageway of the first fluid port may extend inwardly from an opening defined in the distal end. The support bar may further include an inlet fitting secured to the body between the distal end and the first side wall. The inlet fitting may have a bore defined therein connected to the passageway of the first fluid port. The device may also include a source of compressed air that is coupled to the inlet fitting such that compressed air may be advanced into the longitudinal channel of the monolithic metallic plate.

According to another aspect, a support bar for a cutting device configured to cut a block of stone is disclosed. The support bar includes a monolithic metallic plate having a first side wall extending from a first end to a second end of the monolithic metallic plate, a second side wall opposite the first side wall, a bottom wall extending between the first side wall and the second side wall, a longitudinal opening defined in the bottom wall of the monolithic metallic plate, and a pair of inner walls extending upwardly from the opening to define a longitudinal channel in the monolithic metallic plate. One and only one fluid port extends outwardly from the first side wall at each of the first and second ends of the monolithic metallic plate and has a passageway connected to the longitudinal channel. One and only one fluid port extending outwardly from the second side wall at each of the first and second ends of the monolithic metallic plate and has a passageway connected to the longitudinal channel. A length is defined between the first end and the second end of the monolithic metallic plate. The length may be in a range of 90 inches to 185 inches. A width is defined between the first side wall and the second side wall. The width is equal to about 0.25 inches along the length of the monolithic metallic plate.

In some embodiments, the pair of inner walls of the monolithic metallic plate may extend upwardly from the longitudinal opening to a first tapered surface and a second tapered surface connected to the first tapered surface. The first tapered surface may extend from a first channel end to an inner edge connected to the second tapered surface. The second tapered surface may extend from a second channel end to the inner edge.

The longitudinal channel may have a first depth at the first channel end and the second channel end and a second depth at the inner edge that connects the first tapered surface to the second tapered surface. The second depth may be less than the first depth.

In some embodiments, a first steel block and a second steel block may be secured to the monolithic metallic plate. The first steel block may define the first channel end and the second steel block may define the second channel end.

In some embodiments, a first plurality of bores extend through the first side wall and the second side wall at the first end of the monolithic metallic plate. Each bore of the first plurality of bores may have a center point positioned on a first vertically-extending straight imaginary line. In some embodiments, a second plurality of bores extend through the first side wall and the second side wall at the second end of the monolithic metallic plate. Each bore of the second plurality of bores may have a center point positioned on a second vertically-extending straight imaginary line. Each bore of the first plurality of bores and the second plurality of bores may be sized to receive a fastener to secure the support bar to a frame of the cutting device.

In some embodiments, at least one fluid port may include a body extending outwardly from the first side wall to a distal end, and the passageway of the at least one fluid port may extend inwardly from an opening defined in the distal end. An inlet fitting may be secured to the body between the distal end and the first side wall. The inlet fitting may have a bore defined therein connected to the passageway of the at least one fluid port.

According to another aspect, a method of cutting a block of stone is disclosed. The method includes securing a first longitudinal end and a second longitudinal end of the monolithic metallic plate to a movable frame. The monolithic metallic plate has a length defined between the first longitudinal end and the second longitudinal end that is between 90 inches to 185 inches, and a width that is equal to about 0.25 inches along the length. The method also includes positioning a wear bar in a lower longitudinal channel defined in a monolithic metallic plate, moving a cutting belt along a lower longitudinal slot of the wear bar such that the cutting belt defines a substantially straight path. The cutting belt has a maximum width that is equal to about 0.325 inches. The method also includes engaging a lower cutting surface of the moving cutting belt with the block of stone.

According to another aspect of the disclosures, a device for cutting a block of stone includes a platform configured to receive the block of stone, a frame configured to move vertically relative to the platform, and a guide bar assembly having a first longitudinal side and a second longitudinal side. The guide bar assembly includes a monolithic metallic plate that has an upper section and a lower flange extending downwardly from the upper section on the first longitudinal side. The guide bar assembly also includes a wear bar including a lower section secured to the lower flange of the monolithic metallic plate and an upper flange extending upwardly from the lower section. The lower section includes a lower longitudinal slot, and the upper flange is secured to the upper section of the monolithic metallic plate. The upper flange is positioned on the second longitudinal side of the guide bar assembly. The lower flange of the monolithic metallic plate is spaced apart from the upper flange of the wear bar such that a longitudinal channel is defined therebetween.

The device also includes a fastener extending through each bore of a plurality of bores extending through the guide bar assembly to secure the guide bar assembly to the frame, and a cutting belt positioned in the lower longitudinal slot of the wear bar. The cutting belt includes a downward-facing cutting surface.

In some embodiments, the wear bar may include a plurality of passageways extending through the lower section to connect the longitudinal channel to the lower longitudinal slot.

In some embodiments, the guide bar assembly may include a fluid port having a passageway connected to the longitudinal channel. In some embodiments, the longitudinal channel may be closed at each end.

In some embodiments, the guide bar assembly may include a first steel block and a second steel block secured to the monolithic metallic plate, the first steel block defining a first closed end of the longitudinal channel and the second steel block defining a second closed end of the longitudinal channel.

In some embodiments, the lower longitudinal slot of the wear bar may be defined in an arced surface that defines a bottom end of the guide bar assembly.

In some embodiments, a groove may be defined in the lower section of the wear bar. The groove may be sized to receive a tip of the lower flange of the monolithic metallic plate. In some embodiments, a fastener may extend through the tip of the lower flange and the lower section to secure the wear bar to the monolithic metallic plate.

In some embodiments, a groove may be defined in the upper section of the monolithic metallic plate. The groove may be sized to receive a tip of the upper flange of the wear bar. In some embodiments, a fastener may extend through the tip of the upper flange and the upper section to secure the wear bar to the monolithic metallic plate.

According to another aspect, a method of cutting a block of stone includes securing a wear bar to a monolithic metallic plate to form a guide bar assembly and define a fluid channel, securing a first longitudinal end and a second longitudinal end of the guide bar assembly to a movable frame, and moving a cutting belt along a lower longitudinal slot of the wear bar such that the cutting belt defines a substantially straight path. The cutting belt may have a maximum width that is equal to about 0.325 inches. The method also includes advancing fluid along the fluid channel and onto the cutting belt through a plurality of holes defined in the wear bar, and engaging a lower cutting surface of the moving cutting belt with the block of stone.

BRIEF DESCRIPTION OF THE DRAWINGS

The detailed description particularly refers to the following figures, in which.

DETAILED DESCRIPTION OF THE DRAWINGS

Figure 1:
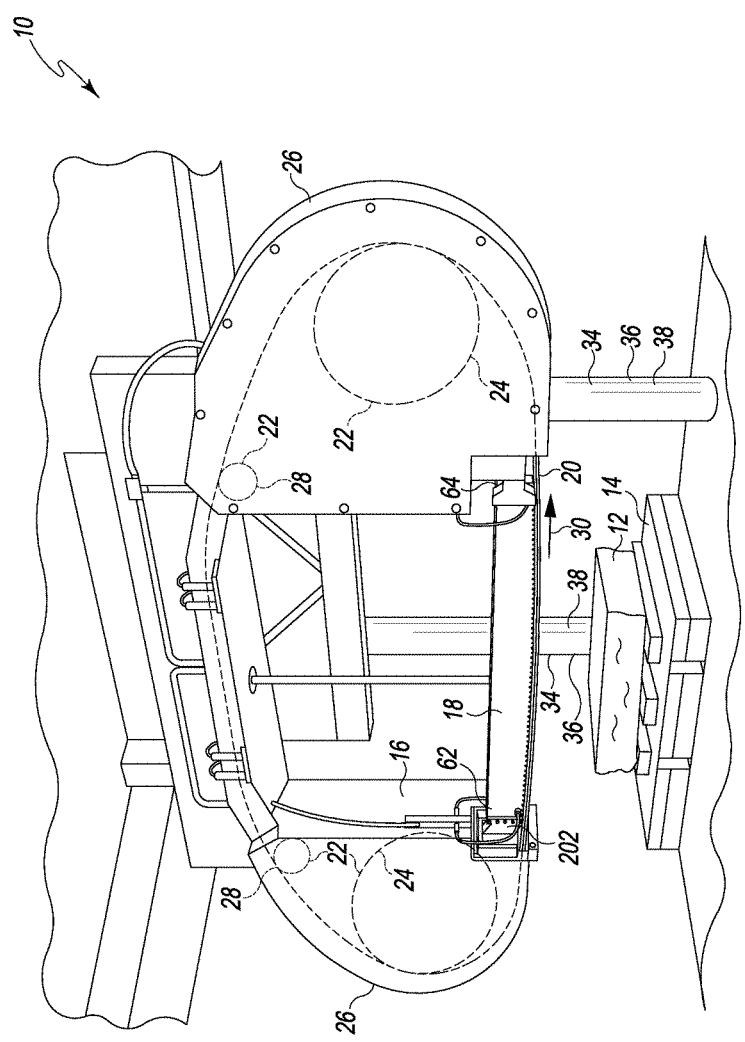
FIG. 1 is a perspective view of a device for cutting a stone block.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring to FIG. 1, a device 10 for cutting a stone block 12 into smaller slabs is shown. The stone block 12 is located on a platform 14 below a frame 16 of the device 10. As described in greater detail below, the frame 16 includes a guide bar assembly 18 that directs a cutting belt 20 along a straight path when cutting the stone block 12. The platform 14 of the device 10 may be mounted on rails, wheels, or other support such that the block 12 may be properly positioned below the cutting belt 20 during a cutting operation and removed after the cutting operation is complete. The frame 16 is configured to move vertically to advance the cutting belt 20 toward or away from the platform 14 (and hence the block 12) during a cutting operation.

The device 10 includes a number of rotating sheaves 22 that are secured to the frame 16. As shown in FIG. 1, the sheaves 22 include a pair of wheels 24, and each wheel 24 is positioned in a housing 26 located on each end of the guide assembly 18. The sheaves 22 also include a pair of smaller wheels 28 positioned above the guide assembly 18. The cutting belt 20 is positioned in grooves (not shown) defined in the outer edges of the wheels 24, 28 and is pulled in the direction indicated by arrow 30 in FIG. 1 by the rotation of the sheaves 22. The sheaves 22 are driven directly or indirectly by an electric motor (not shown).

The device 10 also includes a lift mechanism 34 to raise and lower the frame 16 (and hence the cutting belt 20) relative to the stone block 12. In the illustrative embodiment, the lift mechanism 34 includes a pair of hydraulic actuators 36 positioned on each side of the platform 14. Each actuator 36 includes a cylinder 38 and a piston (not shown) secured to the frame 16. The piston is configured to move telescopically relative to the cylinder 38 to raise and lower the frame 16 during operation. It should be appreciated that in other embodiments the lift mechanism may include a motor-operated rack-and-pinion system, a four-bar linkage, or other mechanism configured to raise and lower the frame 16.

Figure 2:
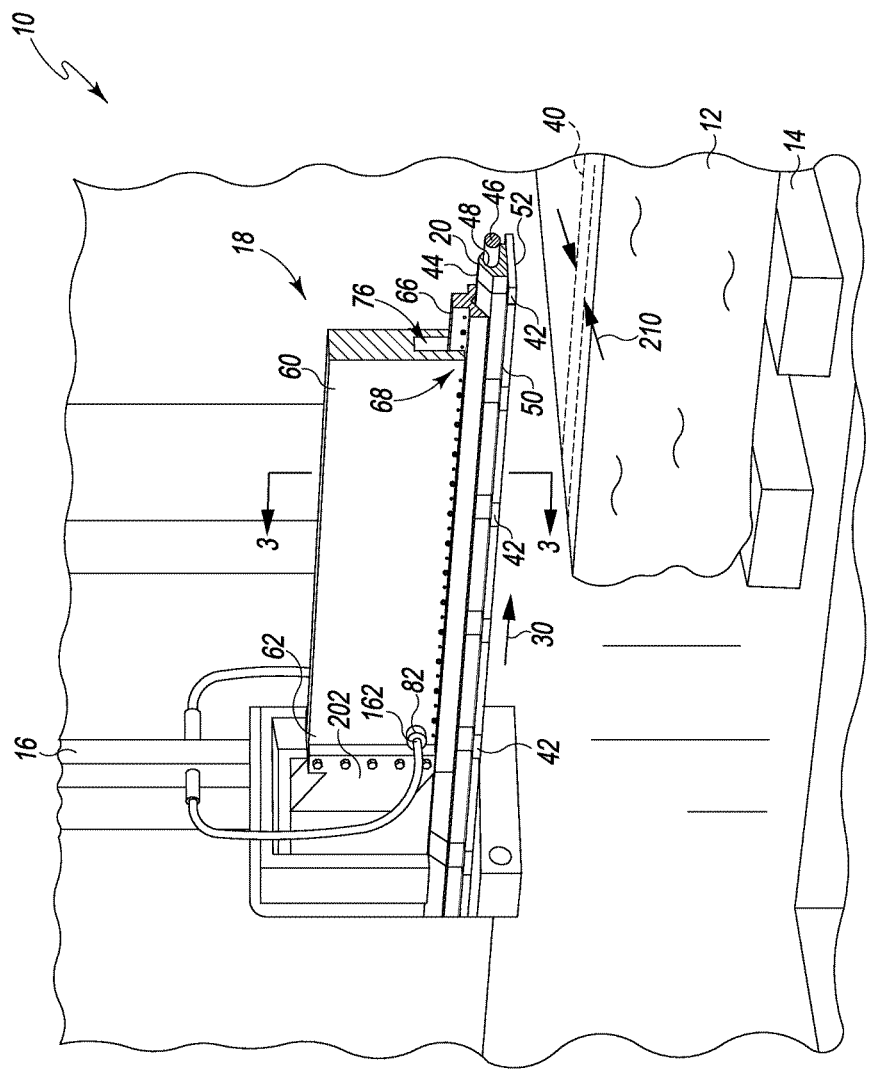
FIG. 2 is a perspective view of one embodiment of a guide assembly and a cutting belt for the device of FIG. 1.

As shown in FIG. 2, when the cutting belt 20 is lowered by the lift mechanism 32 and the belt 20 is pulled around the sheaves 22, the guide assembly 18 directs the belt 20 to remove material from the block 12 along a substantially straight line 40. The cutting belt 20 includes a plurality of cutting segments 42, and each cutting segment 42 is secured to a mounting block 44. A cable 46 extends through a bore 48 defined in each mounting block 44, and a shell 50 is formed over the cable 46 between each mounting block 44 such that the mounting blocks 44 are uniformly spaced apart on the cable 46.

Each segment 42 of the cutting belt 20 is formed from a metallic material such as, for example, stainless steel, and includes a bottom surface 52 configured to cut the stone block 12. In the illustrative embodiment, the bottom surface 52 of each segment 42 has diamond particles or diamond powder embedded therein and projecting outwardly therefrom that cut the stone block 12. It should be appreciated that in other embodiments the bottom surface 52 may be coated with an abrasive pad or include a plurality of cutting teeth configured to cut stone.

Figure 3:
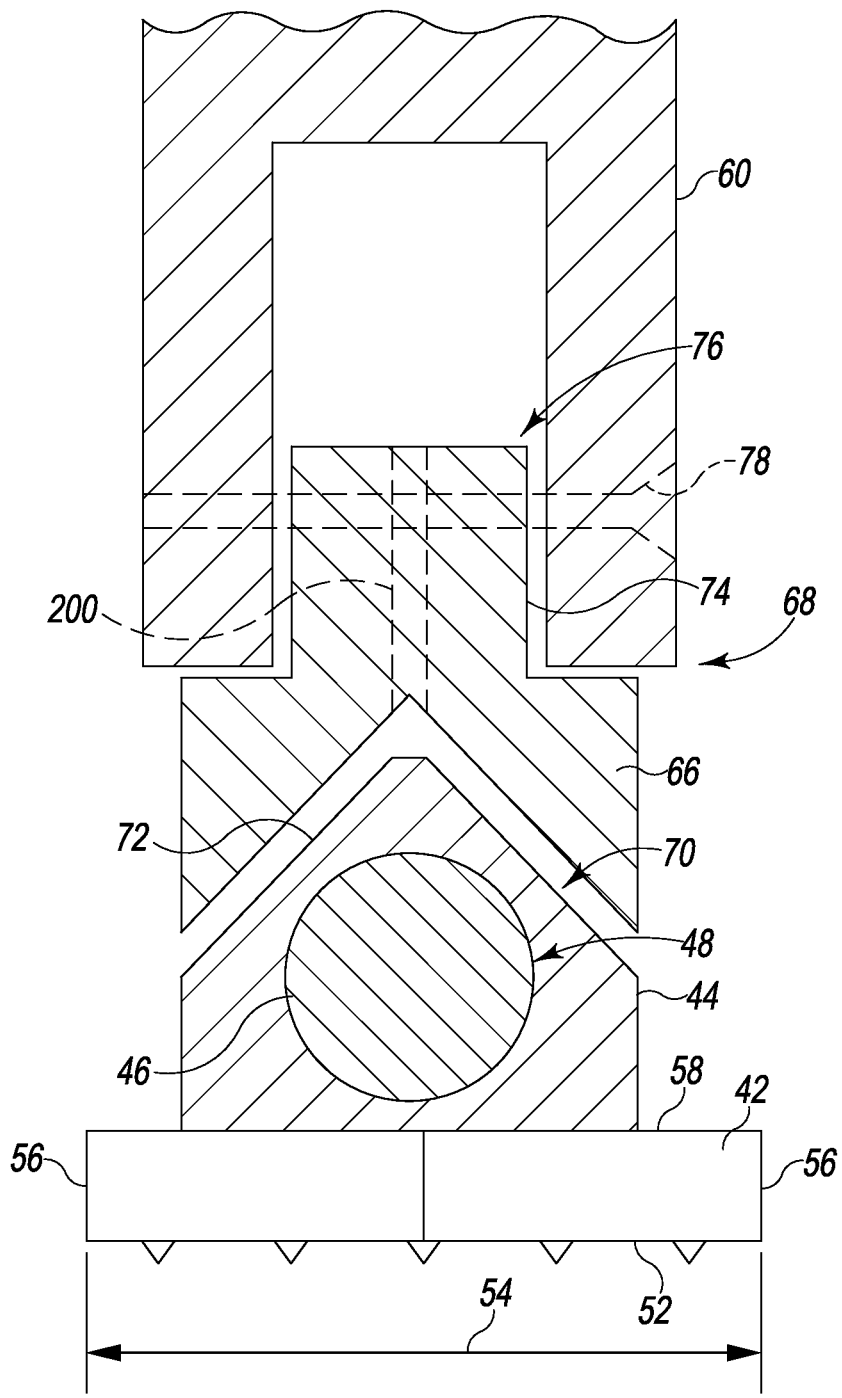
FIG. 3 is a cross-sectional view taken along the line 3-3 in FIG. 2 of the guide assembly and the cutting belt.

As shown in FIG. 3, each segment 42 of the cutting belt 20 has a width 54 defined between its outer-most surfaces 56. The width 54 defines the cutting width of the belt 20 and thereby directly affects the amount of material that is removed or lost when the stone block 12 is cut into smaller slabs. In the illustrative embodiment, the width 54 is equal to about 0.325 inches. As used herein, the term "about" refers to typical machining tolerances such as, for example, ±0.010 inches. In the illustrative embodiment, the width 54 defines the maximum width of the cutting belt 20.

Each mounting block 44 is also formed from a metallic material such as, for example, stainless steel. Each mounting block 44 is secured to the upper surface 58 of one cutting segment 42 via soldering, welding, or other fastening process. In the illustrative embodiment, the cable 46 is formed from woven-metal fiber, and the shell 50 is formed from a plastic or rubber material. The materials used to make the cable 46 and shell 50 are selected to permit the cutting belt 20 to flex as it is pulled around the sheaves 22.

As shown in FIG. 2, the guide bar assembly 18 for the cutting belt 20 includes a support bar 60 coupled at each end 62, 64 to the frame 16. The guide assembly 18 also includes a wear bar or strip 66 that is secured to the bottom end 68 of the support bar 60. In the illustrative embodiment, the wear strip 66 is formed from a metallic material such as, for example, stainless steel.

As shown in FIG. 3, the wear strip 66 includes a downward-facing longitudinal slot 70 that receives the upper sections 72 of the mounting blocks 44 of the belt 20. In the illustrative embodiment, the slot 70 extends the entire length of the wear strip 66 and has the shape of an inverted "V." It should be appreciated that in other embodiments the slot 70 may be curved, rectangular, or any other suitable shape. The size of the slot 70 closely matches the size of the upper sections 72 of the mounting blocks 44 such that the cutting belt 20 is guided along the slot 70 in a substantially straight path.

The wear strip 66 also includes an upper flange 74, which is positioned in a longitudinal channel 76 defined in the bottom end 68 of the support bar 60. A plurality of fasteners 78 extend through the strip 66 and the bar 60 to secure the wear strip 66 to the support bar 60. In the illustrative embodiment, the fasteners 78 include nuts and bolts such that the wear strip 66 may be detached from the support bar 60 and replaced during maintenance. In other embodiments, different fasteners may be used to removably couple the wear strip 66 to the support bar 60. In still other embodiments, the wear strip 66 may be fixed to the support bar 60 via welding or other process such that it is not readily removable from the support bar 60.

Figure 4:
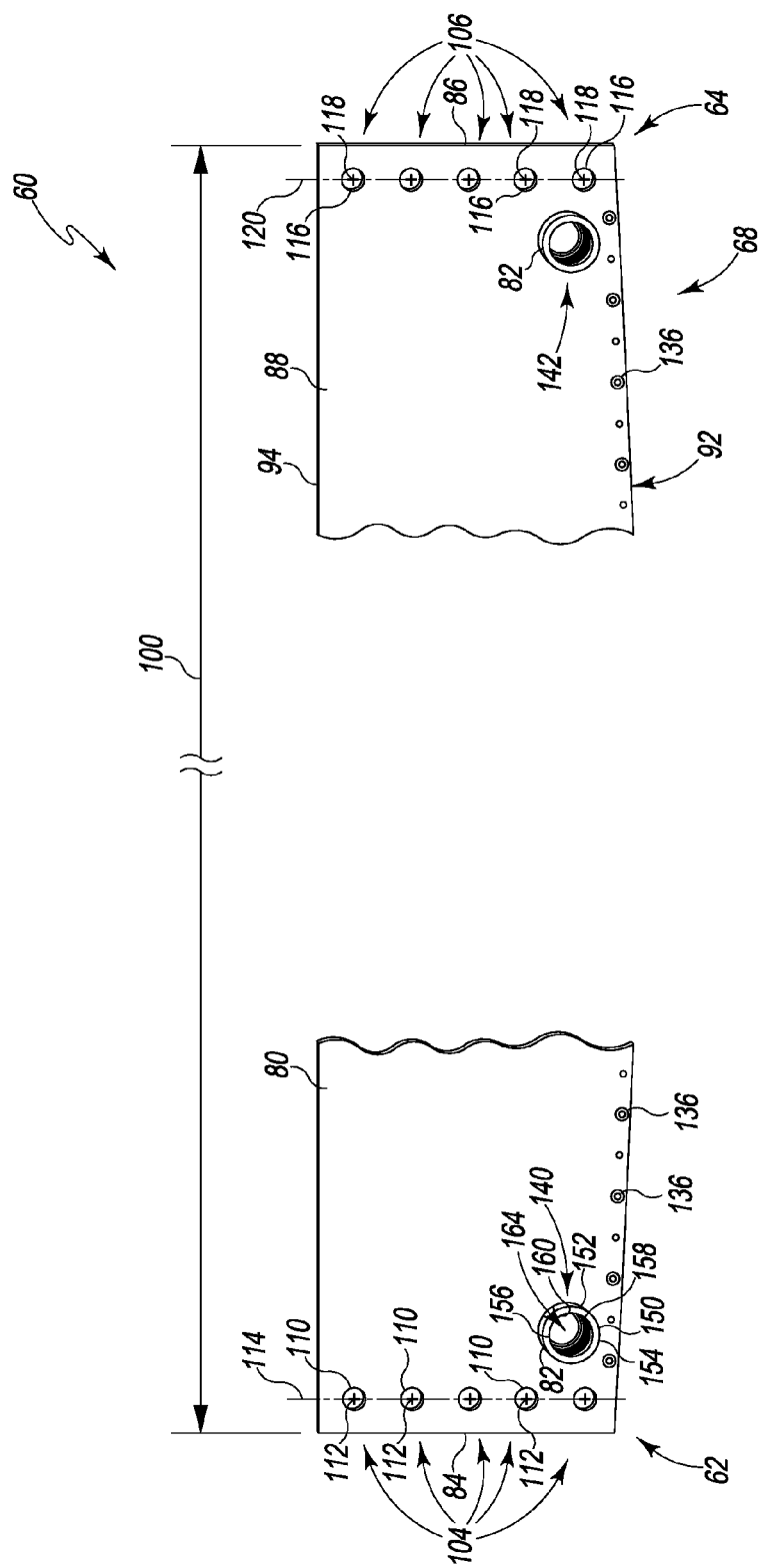
FIG. 4 is a side perspective view of the support bar of the guide assembly of FIGS. 2 and 3.
Figure 5:
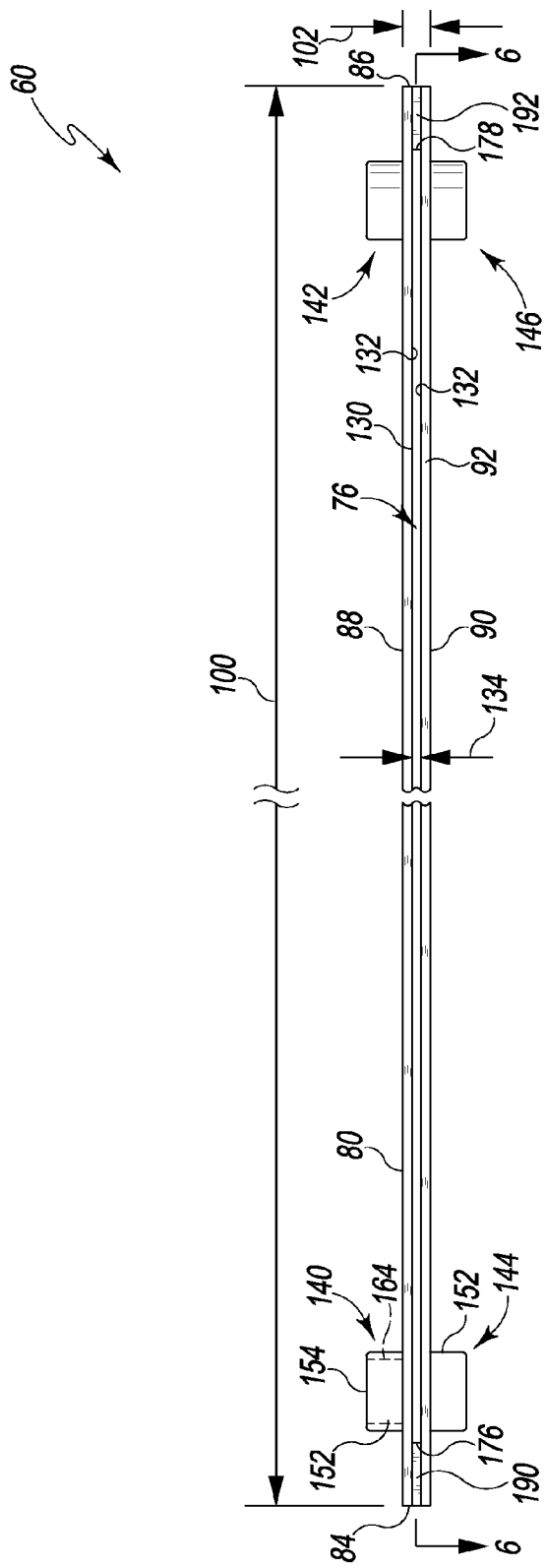
FIG. 5 is a bottom plan view of the support bar of FIG. 4.
Figure 6:
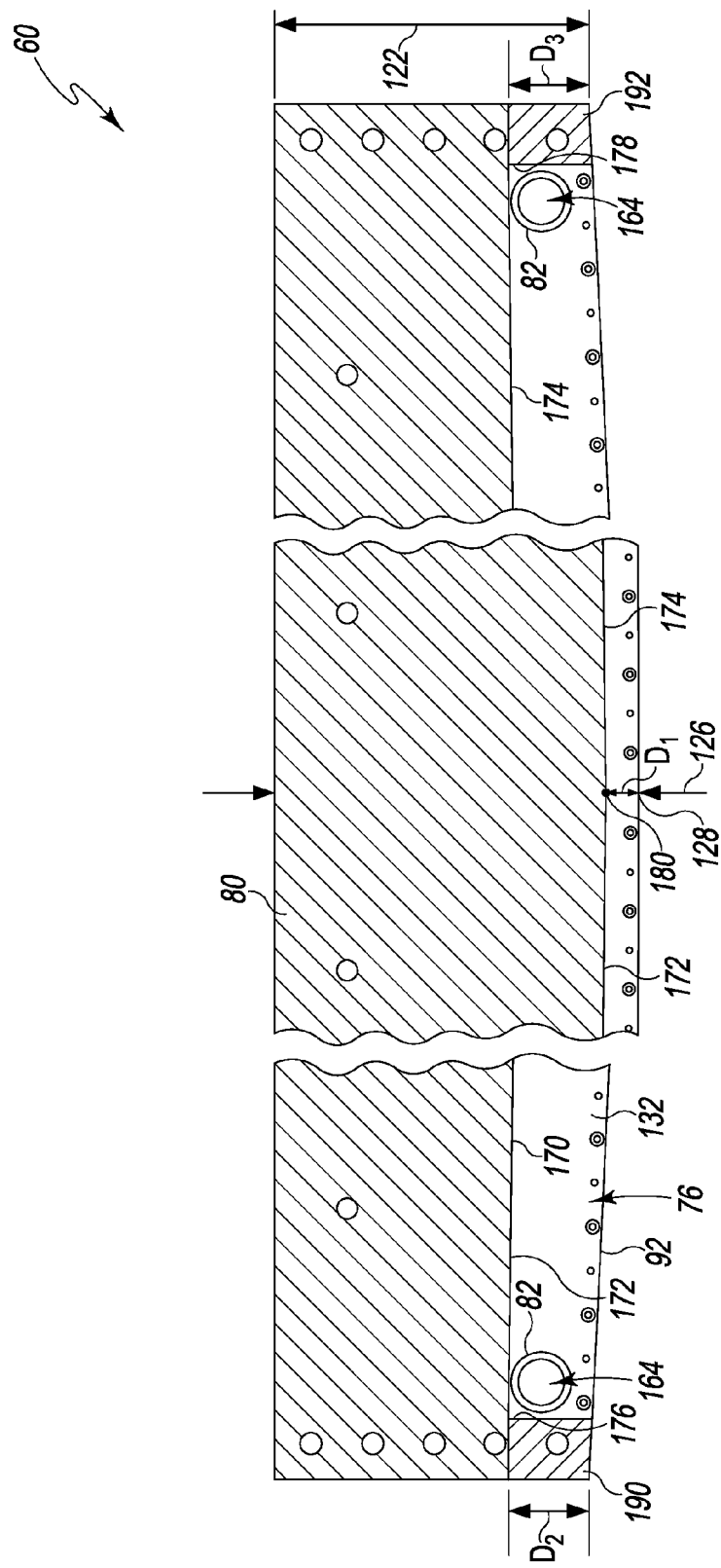
FIG. 6 is a cross-sectional view taken along the line 6-6 in FIG. 5 of the support bar.

Referring now to FIGS. 4-6, the support bar 60 of the guide assembly 18 is shown detached from the device 10 and the wear strip 66. In the illustrative embodiment, the support bar 60 includes a monolithic metallic plate 80 and a number of fluid ports 82 attached to the plate 80. The term "monolithic metallic plate" refers to a metallic structure that is formed from, or is cast as, a single piece of metal. In the illustrative embodiment, the monolithic metallic plate 80 is formed from a single piece of stainless steel, specifically, AISI Type 304 stainless steel. In other embodiments, the monolithic metallic plate 80 may be formed from another stainless steel or metallic materials.

The monolithic metallic plate 80 is illustratively shown as a long, narrow block. The plate 80 has a longitudinal end wall 84 that defines the end 62 of the support bar 60 and another longitudinal end wall 86 that defines the opposite end 64 of the bar 60. A pair of side walls 88, 90 extend between the end walls 84, 86, and the side walls 88, 90 are connected by a bottom wall 92 that defines the bottom end 68 of the support bar 60. In the illustrative embodiment, the bottom wall 92 defines a downwardly-extending arc such that the monolithic metallic plate 80 is taller between the end walls 84, 86, as described in greater detail below. Opposite the bottom wall 92, the monolithic metallic plate 80 includes a top wall 94 that connects the upper ends of the side walls 88, 90.

As shown in FIG. 5, the end walls 84, 86 define a length 100 of the monolithic metallic plate 80, while the side walls 88, 90 define the width 102 of the plate 80. In the illustrative embodiment, the length 100 is in a range of about 90 inches to about 185 inches. It should be appreciated that in other embodiments the length may vary according to size of the stone blocks and/or the device 10.

The width 102 of the monolithic metallic plate 80 must be less than the width 54 of the cutting belt 20 such that the monolithic metallic plate 80 may follow the path of the cutting belt 20 through the stone block 12. Consequently, the width 102 of the monolithic metallic plate 80 has a direct effect on the amount of material that is removed or lost when the stone block 12 is cut into smaller slabs. As shown in FIG. 5, the width 102 of the monolithic metallic plate 80 is equal to about 0.25 inches. In the illustrative embodiment, the width 102 is substantially the same along the length 100 of the plate 80. As shown in FIG. 3, the width of the wear strip 66 is less than the width of the monolithic metallic plate 80. In other embodiments, the width of the wear strip 66 may be greater than the width of the plate 80, but it must be less than the width 54 of the cutting belt 20 such that the assembly 18 may follow the path of the cutting belt 20 through the stone block 12.

As described above, the support bar 60 is coupled to the frame 16 at each of the ends 62, 64. In the illustrative embodiment, the monolithic metallic plate 80 includes a plurality of bores 104, 106 at the ends 62, 64, respectively, that are sized to receive fasteners 108 (see FIG. 2) to couple the plate 80 to the frame 16. As shown in FIG. 4, the plurality of bores 104 are positioned adjacent to the end wall 84 of the monolithic metallic plate 80 and extend between openings 110 defined in the side walls 88, 90. Each bore 104 has a center point 112 that is positioned on a vertically-extending imaginary line 114 such that each bore 104 is positioned above the previous bore 104.

As shown in FIG. 4, the other plurality of bores 106 are positioned adjacent to the opposite end wall 86 of the monolithic metallic plate 80. Each bore 106 extends between openings 116 defined in the side walls 88, 90. Each bore 106 has a center point 118 that is positioned on a vertically-extending imaginary line 120 such that each bore 106 is positioned above the previous bore 106. In the illustrative embodiment, the lines 114, 120 are parallel the bores 104, 106 are spaced apart by the same about at each of the ends 62, 64.

As shown in FIG. 6, the monolithic metallic plate 80 has a height 122 defined between the bottom wall 92 and the top wall 94 at each of the ends 62, 64. In the illustrative embodiment, the height 122 is equal to about 9.5 inches. As described above, the bottom wall 92 defines a downwardly-extending arc between the ends 62, 64. The bottom wall 92 has a low peak 124 positioned between the ends 62, 64 that defines another height 126 of the monolithic metallic plate 80. In the illustrative embodiment, the height 126 is about 10.5 inches. It should be appreciated that in other embodiments the height of the monolithic metal plate 80 may vary depending on such factors as the configuration of the device 10 and the length of the monolithic metal plate 80.

As described above, the support bar 60 has a longitudinal channel 76 defined in its bottom end 68, which receives the upper flange 74 of the wear strip 66. As shown in FIG. 5, a channel opening 130 is defined in the bottom wall 92 of the monolithic metallic plate 80. A pair of inner walls 132 extend inwardly from the opening 130 to partially define the channel 76. Each inner wall 132 is substantially flat and cooperate to define a channel width 134. In the illustrative embodiment, the channel width 134 is about 0.090 inches. In some embodiments, the channel width 134 may be in a range of 0.085 inches to 0.090 inches.

Returning to FIG. 4, the monolithic metallic plate 80 includes a plurality of through holes 136, which are positioned adjacent to the bottom end 68 of the support bar 60. Each through hole 136 extends between openings defined in the side walls 88, 90. In that way, the through holes 136 extend through the inner walls 132 and open into the channel 76. Each through hole 136 is sized to receive one of the fasteners 78 that secure the wear strip 66 to the support bar 60. Each through hole 136 includes a relief that permits the fastener 78 to be countersunk into the monolithic metallic plate 80.

As described above, the support bar 60 also includes a number of fluid ports 82 that are attached to the monolithic metallic plate 80. As shown in FIG. 4, the fluid ports 82 of the support bar 60 include a fluid port 140 that is positioned adjacent to the end 62 and extending outwardly from the side wall 88. Another fluid port 142 extending outwardly from the side wall 88 is positioned adjacent to the opposite end 64. Another pair of fluid ports 144, 146 extend outwardly from the opposite side wall 90 (see FIG. 5). As shown in FIG. 4, the fluid ports 140, 144 are coaxially aligned, and the fluid ports 142, 146 are similarly coaxially aligned. It should be appreciated that in other embodiments the ports 140, 144 and 142, 146 may be offset from each other. In some embodiments, the fluid ports 144, 146 may be omitted from the support bar 60.

In the illustrative embodiment, each of the fluid ports 82 has substantially the same configuration. Each fluid port 82 includes a metallic body 150 that is welded to the monolithic metallic plate 80. In other embodiments, the body 150 may be secured to the monolithic metallic plate 80 via the use of fasteners, threading, or other fastening means. Each body 150 has a cylindrical outer surface 152 that extends from the corresponding side wall 88, 90 to a distal end 154. An opening 156 is defined in the distal end 154 of the body 150, and a cylindrical inner wall 158 extends inwardly from the opening 156. In the illustrative embodiment, a plurality of threads 160 are defined in the inner wall 158 and are configured to receive a hose connector 162 (see FIG. 2) of the device 10.

The cylindrical inner wall 158 defines a passageway 164 through the fluid port 82. As shown in FIG. 6, each passageway 164 opens into the longitudinal channel 76 of the monolithic metallic plate 80. In that way, the passageway 164 permits fluid to be advanced from the connector 162 of the device 10 to the channel 76 of the plate 80, which is configured to direct the fluid downward toward the wear strip 66 (and hence the cutting belt 20).

As described above, the monolithic metallic plate 80 includes a pair of inner walls 132 that extend inwardly from an opening 130 to define the longitudinal channel 76. As shown in FIG. 6, each inner wall 132 extends inwardly from the opening 130 to an inner surface 170 that defines the upper end of the channel 76. The inner surface 170 includes a pair of tapered surfaces 172, 174 that extend from each end 176, 178, respectively, of the channel 76, and are joined at an edge 180. In the illustrative embodiment, the edge 180 is located midway between the ends 176, 178 of the channel 76. It should be appreciated that in other embodiments the edge 180 may be offset from the middle of the channel 76, toward either the end 176 or the end 178.

The longitudinal channel 76 has a depth $D_1$ defined between the edge 180 of the inner surface 170 and the bottom wall 92. The longitudinal channel has another depth $D_2$ defined between the end 176 of the tapered surface 172, and a depth $D_3$ defined between the end 178 of the tapered surface 174. In the illustrative embodiment, the depth $D_3$ is equal to the depth $D_2$. It should be appreciated that in other embodiments the depth $D_3$ may be different from the depth $D_2$.

Additionally, the depths $D_2$, $D_3$ are greater than the depth $D_1$ such that the edge 180 defines the low point of the channel 76. In that way, the channel 76 slopes downwardly to direct fluid from the passageways 164 of the fluid ports 82 toward the wear strip 66 (and hence the cutting belt 20) along the length of the channel 76. In the illustrative embodiment, each of the depths $D_2$, $D_3$ is equal to about 2.5 inches and the depth $D_1$ is equal to about 1.0 inches.

As shown in FIGS. 5 and 6, the longitudinal channel 76 is closed at each of its ends 176, 178. In the illustrative embodiment, the support bar 60 includes a block 190 that is inserted between the inner walls 132 of the monolithic metallic plate 80 to close the end 176 of the channel 76. The opposite end 178 of the channel 76 is closed by another block 192 inserted between the inner walls 132. Each of the blocks 190, 192 is formed from a metallic material and is welded to the monolithic metallic plate 80. In other embodiments, the ends of the channel 76 may be closed by portions of the metallic plate 80. In still other embodiments, plastic inserts may be used to close the channel 76. It should also be appreciated that in other embodiments the ends of the channel 76 may be open.

Returning to FIG. 3, the wear strip 66 includes a plurality of passageways 200 that open into the channel 76 when the wear strip 66 is secured to the monolithic metallic plate 80. Fluid advanced from the fluid ports 82 and along the channel 76 may move down each passageway 200 into the slot 70 defined in the bottom of the wear strip 66 and over the cutting belt 20. As such, when the belt 20 is driven by the sheaves 22, fluid may be passed over the belt 20 to lubricate the belt 20 (and block 12) during a cutting operation.

In use, the guide assembly 18 is attached to the frame 16. To do so, one end 62 of the monolithic metallic plate 80 is aligned with a mounting bracket 202 (see FIG. 2) of the frame 16 and the opposite end 64 of the plate 80 may be aligned with another bracket 202. The ends 62, 64 may then be positioned in the mounting brackets 202 and fasteners 108 advanced through the brackets 202 and each of the bores 104, 106 to secure the monolithic metallic plate 80 to the frame 16.

The wear strip 66 may then be attached to the monolithic metallic plate 80. To do so, the upper flange 74 of the wear strip 66 may be aligned with and then inserted into the longitudinal channel 76 defined in the plate 80. The fasteners 78 may then be advanced into the through holes 136 defined in the plate 80 to secure the wear strip 66 to the plate 80. It should be noted that the strip 66 may be attached before or after the monolithic metallic plate 80 is attached to the frame 16. After the wear strip 66 is attached to the monolithic metallic plate 80, the cutting belt 20 may be positioned in the guide slot 70 of the wear strip 66, and the hose connector 162 of the device 10 may be attached to the fluid ports 82, as shown in FIG. 2.

In operation, a block 12 is positioned below the frame 16 on the platform 14. The motor may be energized to rotate the sheaves 22 such that the belt 20 is pulled in the direction indicated by arrow 30 in FIGS. 1 and 2 as the frame 16 is lowered by the lift mechanism 32. As described above, the belt 20 may be advanced into contact with the block 12, and the guide assembly 18 directs the belt 20 to remove material from the block 12 along a substantially straight line 40. As shown in FIG. 2, the width 210 of the straight line 40 corresponds to the amount of material removed by the belt 20. In the illustrative embodiment, the width 210 is less than or equal to about 0.370 inches. The width 210 may be in a range of about 0.340 inches to 0.370 inches.

Fluid is advanced from the device 10 through the connectors 162 and the fluid ports 82, along the channel 76 of the plate 80, and down each passageway 200 of the wear strip 66 into the slot 70 defined in the bottom of the wear strip 66 and over the cutting belt 20. As such, as the belt 20 is driven by the sheaves 22, fluid is passed over the belt 20 to lubricate the belt 20 (and block 12) during the cutting operation.

Figure 7:
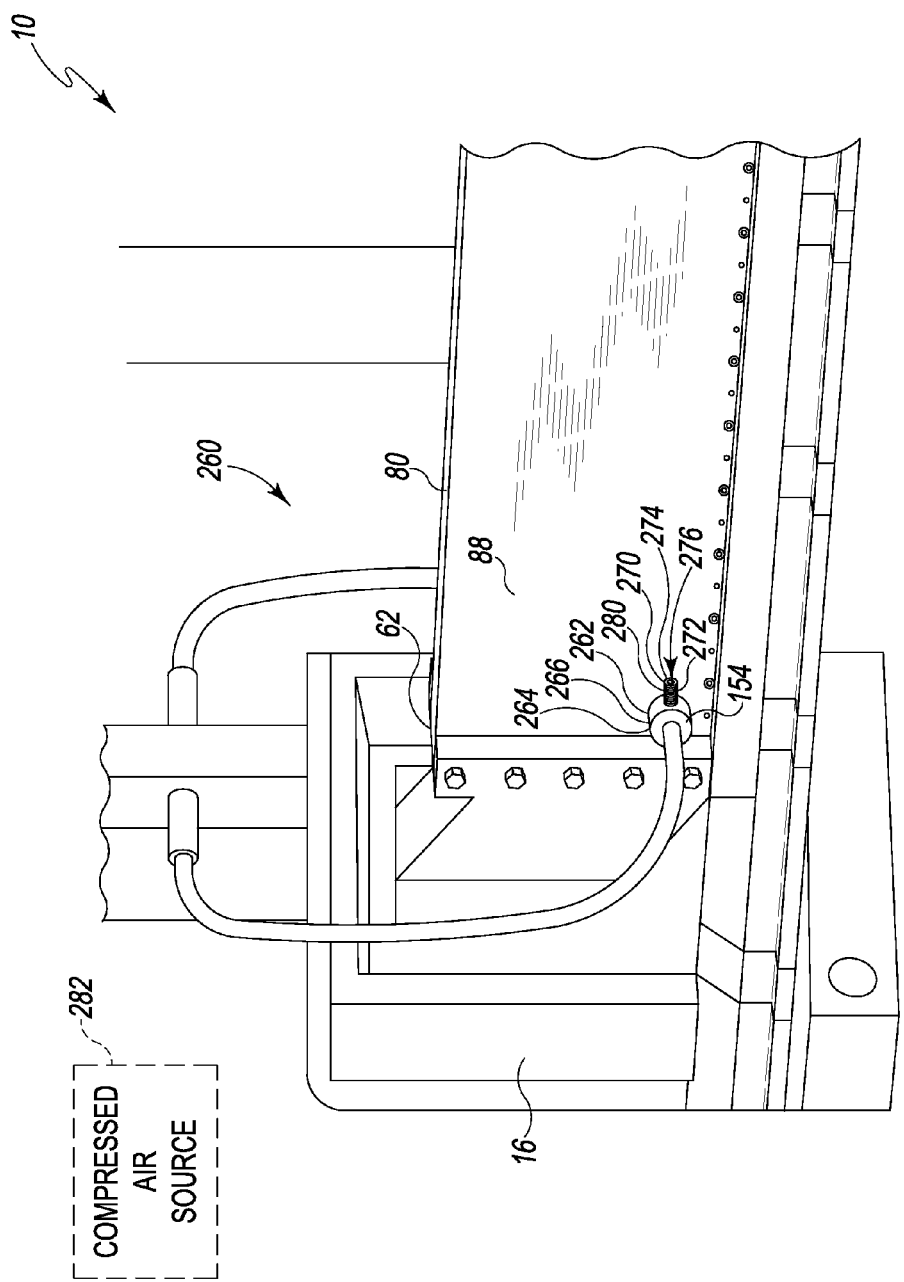
FIG. 7 is a perspective view of another embodiment of a guide assembly for the device of FIG. 1.

Referring now to FIG. 7, another embodiment of a support bar (hereinafter the support bar 260) is shown. Some of the features of the embodiment illustrated in FIG. 7 are substantially similar to those described above in reference to the embodiment of FIGS. 1-6. Such features are designated in FIG. 7 with the same reference numbers as those used in FIGS. 1-6. As shown in FIG. 7, the support bar 260 includes a monolithic metallic plate 80, a fluid port 262, and a number of other fluid ports (not shown).

The fluid port 262, like the fluid ports 82 described above in regard to FIGS. 1-6, is attached to the monolithic metallic plate 80. The fluid port 262 is positioned adjacent to the end 62 of the support bar 260 and extends outwardly from the side wall 88 of the monolithic metallic plate 80. The fluid port 262 includes a metallic body 264 that is welded to the monolithic metallic plate 80. In other embodiments, the body 264 may be secured to the monolithic metallic plate 80 via the use of fasteners, threading, or other fastening means.

The body 264 has a cylindrical outer surface 266 that extends from the side wall 88 to a distal end 154. The body 264 also includes a passageway 164 that extends through the fluid port 262. The passageway 164 of fluid port 262, like the passageways described above in regard to FIGS. 1-6, permits fluid to be advanced from the connector 162 of the device 10 to the channel 76 of the plate 80, which is configured to direct the fluid downward toward the wear strip 66 (and hence the cutting belt 20).

As shown in FIG. 7, the support bar 260 also includes an inlet fitting 270 that is secured to the body 264 of the fluid port 262. In the illustrative embodiment, the inlet fitting 270 is positioned between the side wall 88 and the distal end 154. As shown in FIG. 7, the inlet fitting 270 includes a body 272 that extends outwardly of the surface 266 to a fitting end 274. A passage 276 extends inwardly from the end 274 and opens into the passageway 164 of the fluid port 262. In the illustrative embodiment, the outer surface of the fitting body 272 includes a National Pipe Thread (NPT) 280, which is configured to receive a connector (not shown) of a source of pressurized air 282. The air source 282 may take the form of a compressor secured to the device 10.

In use, the source 282 may be connected to the inlet fitting 270 after a cutting operation. Pressurized air may be advanced into the longitudinal channel 76 of the plate 80 via the fitting 270 and the port 262 to remove debris or other material from the channel 76.

Figure 8:
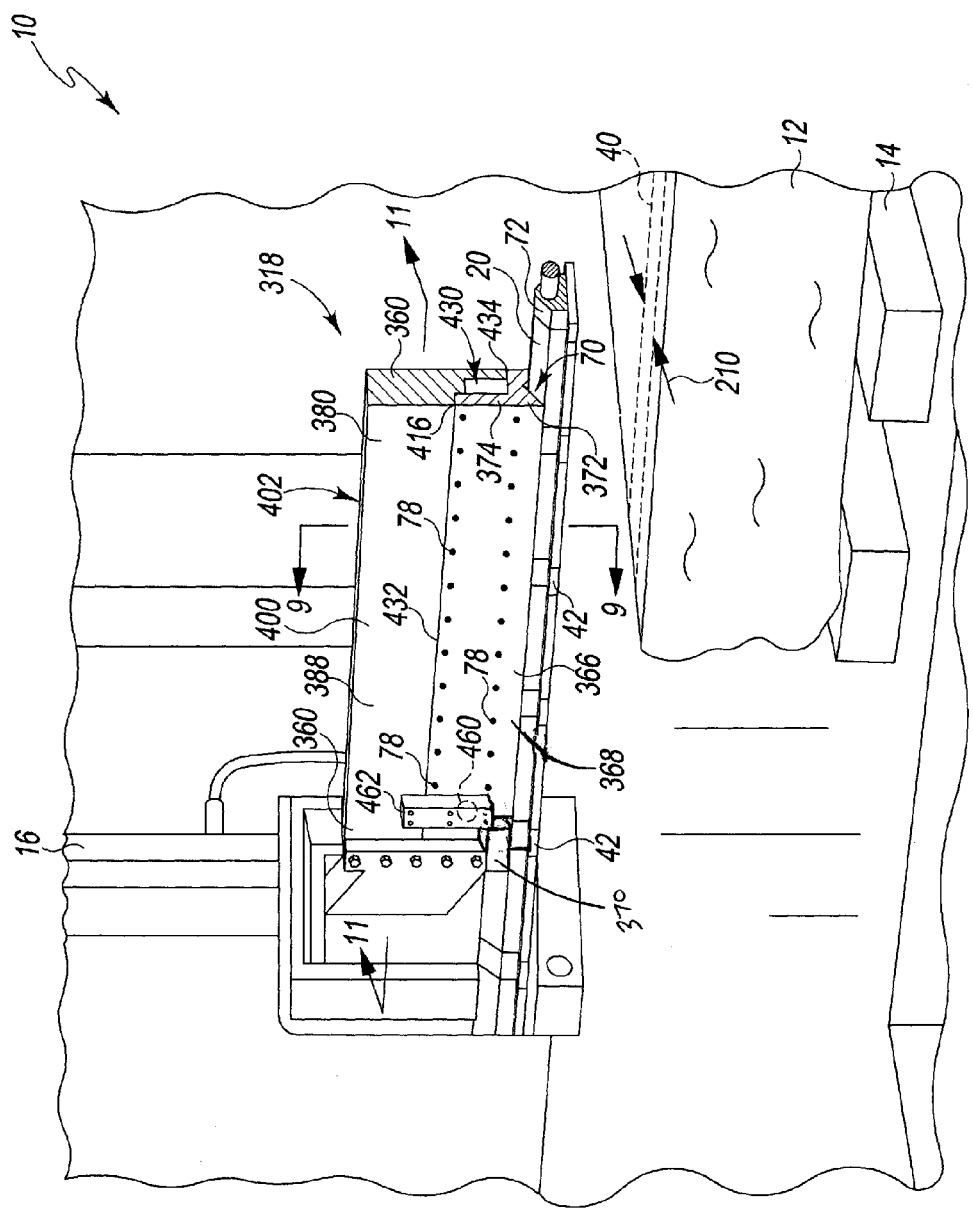
FIG. 8 is a perspective view of another embodiment of a guide assembly for the device of FIG. 1.

Referring now to FIG. 8, another embodiment of a guide bar assembly (hereinafter the guide bar assembly 318) is shown. Some of the features of the embodiment illustrated in FIG. 8 are substantially similar to those described above in reference to the embodiments of FIGS. 1-7. Such features are designated in FIG. 8 with the same reference numbers as those used in FIGS. 1-7. As shown in FIG. 8, the guide bar assembly 318 for the cutting belt 20 includes a support bar 360 coupled at each end 362, 364 to the frame 16 of the device 10. The guide assembly 318 also includes a wear bar or strip 366 that is secured to the support bar 360.

The wear strip 366 may be formed as a single monolithic component or from multiple components. In the illustrative embodiment, the wear strip 366 includes a longitudinal body 368 that extends most of the length of the guide assembly 318 and two end pieces 370 positioned at each end of the body 368. In the illustrative embodiment, each piece of the wear strip 366 is formed from a metallic material such as, for example, cold-drawn steel. One steel that may be used to form the wear strip 366 is 10-18 cold-drawn steel.

Figure 9:
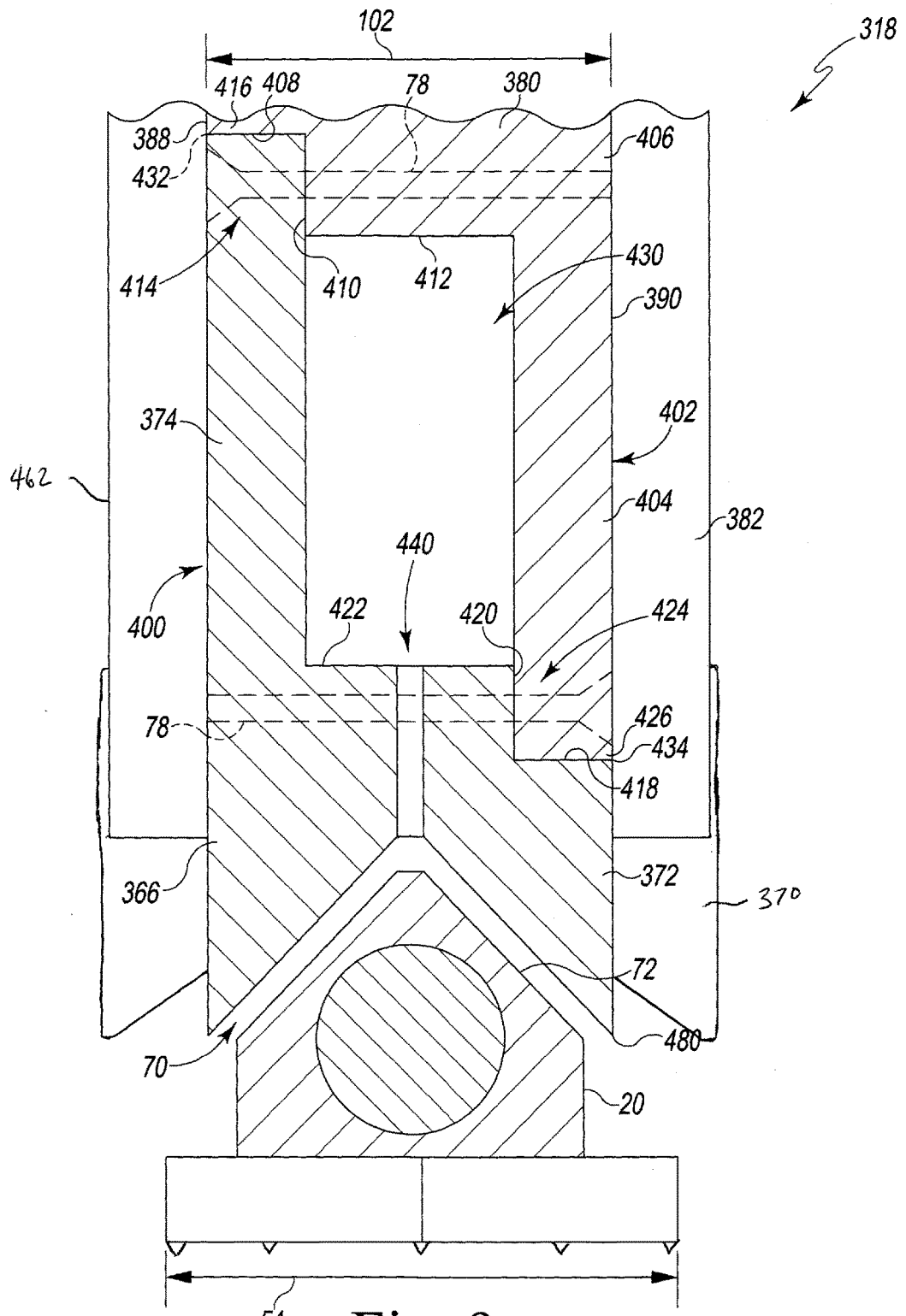
FIG. 9 is a cross-sectional view taken along the line 9-9 in FIG. 8 of the guide assembly and the cutting belt.

As shown in FIG. 9, the wear strip 366 includes a downward-facing longitudinal slot 70 that receives the upper sections 72 of the mounting blocks 44 of the belt 20. In the illustrative embodiment, the slot 70 extends the entire length of the wear strip 366 and has the shape of an inverted "V." It should be appreciated that in other embodiments the slot 70 may be curved, rectangular, or any other suitable shape. In the longitudinal body 368, the size of the slot 70 closely matches the size of the upper sections 72 of the mounting blocks 44 such that the cutting belt 20 is guided along the slot 70 in a substantially straight path. In the end pieces 370 of the wear strip 366, the slot 70 is slightly larger such that the end pieces 370 act as a feed device for the cutting belt 20.

The slot 70 is defined in a lower section 372 of the wear strip 366. As shown in FIG. 9, the wear strip 366 includes an upper flange 374 that extends upwardly from the lower section 372. A plurality of fasteners 78 extend through the flange 374, the lower section 372, and the bar 360 to secure the wear strip 366 to the support bar 360. In the illustrative embodiment, the fasteners 78 include nuts and bolts such that the wear strip 366 may be detached from the support bar 360 and replaced during maintenance. In other embodiments, different fasteners may be used to removably couple the wear strip 366 to the support bar 360. In still other embodiments, the wear strip 366 may be fixed to the support bar 360 via welding or other process such that it is not readily removable from the support bar 360.

The support bar 360 of the guide bar assembly 318 includes a monolithic metallic plate 380, and a number of fluid ports or manifolds 382 are attached to the plate 380, as described in greater detail below. In the illustrative embodiment, the monolithic metallic plate 380 is formed from a single piece of stainless steel, specifically, AISI Type 304 stainless steel. In other embodiments, the monolithic metallic plate 380 may be formed from another stainless steel or metallic materials.

The monolithic metallic plate 380 is illustratively shown as a long, narrow block. The plate 380 has a longitudinal end wall 384 that defines the end 362 of the support bar 360 and another longitudinal end wall 386 that defines the opposite end 364. A pair of side walls 388, 390 extend between the end walls 384, 386, and the side walls 388, 390 are connected at their upper ends by a top wall 94.

Figure 10:
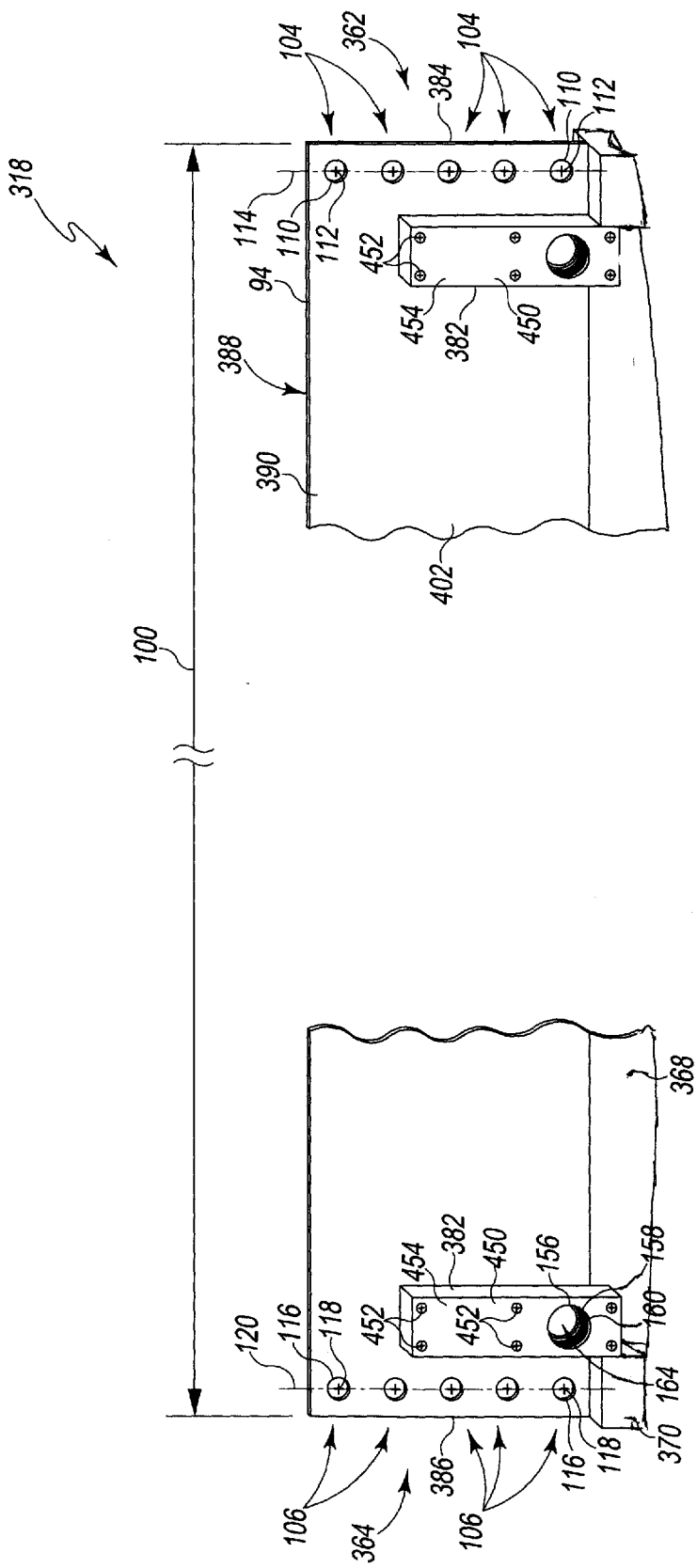
FIG. 10 is a side perspective view of the guide assembly of FIGS. 8 and 9.

As shown in FIG. 10, the end walls 384, 386 define a length 100 of the monolithic metallic plate 380, while the side walls 388, 390 define the width 102 of the plate 380. In the illustrative embodiment, the length 100 is in a range of about 90 inches to about 185 inches. It should be appreciated that in other embodiments the length may vary according to size of the stone blocks and/or the device 10.

The width 102 of the monolithic metallic plate 380 must be less than the width 54 of the cutting belt 20 such that the monolithic metallic plate 380 may follow the path of the cutting belt 20 through the stone block 12. Consequently, the width 102 of the monolithic metallic plate 80 has a direct effect on the amount of material that is removed or lost when the stone block 12 is cut into smaller slabs. As shown in FIG. 9, the width 102 of the monolithic metallic plate 380 is equal to about 0.25 inches. In the illustrative embodiment, the width 102 is substantially the same along the length 100 of the plate 380. As shown in FIG. 9, the width of the body 368 of the wear strip 366 is equal to the width 102 of the monolithic metallic plate 380. In other embodiments, the width of the wear strip 366 may be greater than the width of the plate 380, but it must be less than the width 54 of the cutting belt 20 such that the assembly 318 may follow the path of the cutting belt 20 through the stone block 12.

The support bar 360, like the support bar 60 described above, may be coupled to the frame 16 at each of the ends 362, 364. In the illustrative embodiment, the monolithic metallic plate 380 includes a plurality of bores 104, 106 at the ends 362, 364, respectively, that are sized to receive fasteners 108 (see FIG. 8) to couple the plate 380 to the frame 16. As shown in FIG. 10, the plurality of bores 104 are positioned adjacent to the end wall 384 of the monolithic metallic plate 380 and extend between openings 110 defined in the side walls 388, 390. Each bore 104 has a center point 112 that is positioned on a vertically-extending imaginary line 114 such that each bore 104 is positioned above the previous bore 104.

As shown in FIG. 10, the other plurality of bores 106 are positioned adjacent to the opposite end wall 386 of the monolithic metallic plate 380. Each bore 106 extends between openings 116 defined in the side walls 388, 390. Each bore 106 has a center point 118 that is positioned on a vertically-extending imaginary line 120 such that each bore 106 is positioned above the previous bore 106.

In the illustrative embodiment, the lines 114, 120 are parallel the bores 104, 106 are spaced apart by the same about at each of the ends 362, 364. It should be appreciated that in other embodiments one or more of the bores 104, 106 may extend through the wear strip 366. In such embodiments, one or more of the fasteners 108 would extend through both the plate 380 and the wear strip 366 to couple the guide assembly 318 to the frame 16.

Returning to FIG. 9, the guide assembly 318 includes a pair of longitudinal sides 400, 402. The upper flange 374 of the wear strip 366 is positioned on the longitudinal side 400. The monolithic metallic plate 380 includes a lower flange 404 that is positioned opposite the upper flange 374 on the other side 402 of the guide assembly 318. The lower flange 404 extends downwardly from an upper section 406 of the plate 380. As shown in FIG. 9, the upper section 406 includes a substantially flat lower surface 408 that extends inwardly from the side wall 388 on the longitudinal side 400 to an inner side wall 410. The inner side wall 410, which is also substantially flat in the illustrative embodiment, extends downwardly to a bottom surface 412 of the upper section 406. The bottom surface 412 extends toward the longitudinal side 402 and is connected to the lower flange 404.

In the illustrative embodiment, the lower surface 408 and the inner side wall 410 cooperate to define a longitudinal groove 414 in the plate 380. As shown in FIG. 9, the upper flange 374 of the wear strip 366 includes a tip 416 that is received in the groove 414. Some of the fasteners 78 extend through the upper flange 374 of the wear strip 366 and the inner side wall 410 of the plate 380 to secure the wear strip 366 to the plate 380.

As described above, the wear strip 366 includes a lower section 372. The lower section 372 includes a substantially flat upper surface 418 that extends inwardly from the longitudinal side 402 of the guide assembly 318 to an inner side wall 420. The inner side wall 420, which is also substantially flat in the illustrative embodiment, extends upwardly to a top surface 422 of the lower section 372. The top surface 422 extends toward the longitudinal side 400 and is connected to the upper flange 374.

In the illustrative embodiment, the upper surface 418 and the inner side wall 420 of the wear strip 366 cooperate to define a longitudinal groove 424. As shown in FIG. 9, the lower flange 404 of the plate 380 includes a tip 426 that is received in the groove 424. Some of the fasteners 78 extend through the lower flange 404 of the plate 380 and the inner side wall 420 of the wear strip 366 to secure the wear strip 366 to the plate 380.

As shown in FIGS. 8-9, the wear strip 366 and the monolithic metallic plate 380 cooperate to define a longitudinal channel 430 in the guide assembly 318. Like the channel 76 described above in regard to FIGS. 1-6, the channel 430 is configured to direct fluid to the cutting belt 20, as described in greater detail below. In the illustrative embodiment, the channel 430 is sealed along the seams 432, 434 defined between the flanges 374, 404 and the sections 372, 406 of the wear strip 366 and plate 380. In that way, fluid advanced into the channel 430 is substantially prevented from leaking through the seams 432, 434. In the illustrative embodiment, the seams 432, 434 are sealed with silicone. It should be appreciated that in other embodiments other sealing materials may be used to seal the seams 432, 434 to prevent leakage. For example, the wear strip 366 and plate 380 may be configured to receive an o-ring or other gasket to seal the seams 432, 434. In other embodiments, the guide assembly 318 may be configured to permit fluid to leak through the seams 432, 434.

As shown in FIG. 9, the top surface 422 of the wear strip 366 and the bottom surface 412 of the plate 380 enclose the bottom and top, respectively, of the channel 430, while the upper flange 374 of the strip 366 and the lower flange 404 of the plate 380 enclose the other sides of the channel 430. As shown, the channel 430 has a substantially rectangular cross-section. It should be appreciated that in other embodiments the cross-section of the channel 430 may be circular, hexagonal, or other geometric shape.

Figure 11:
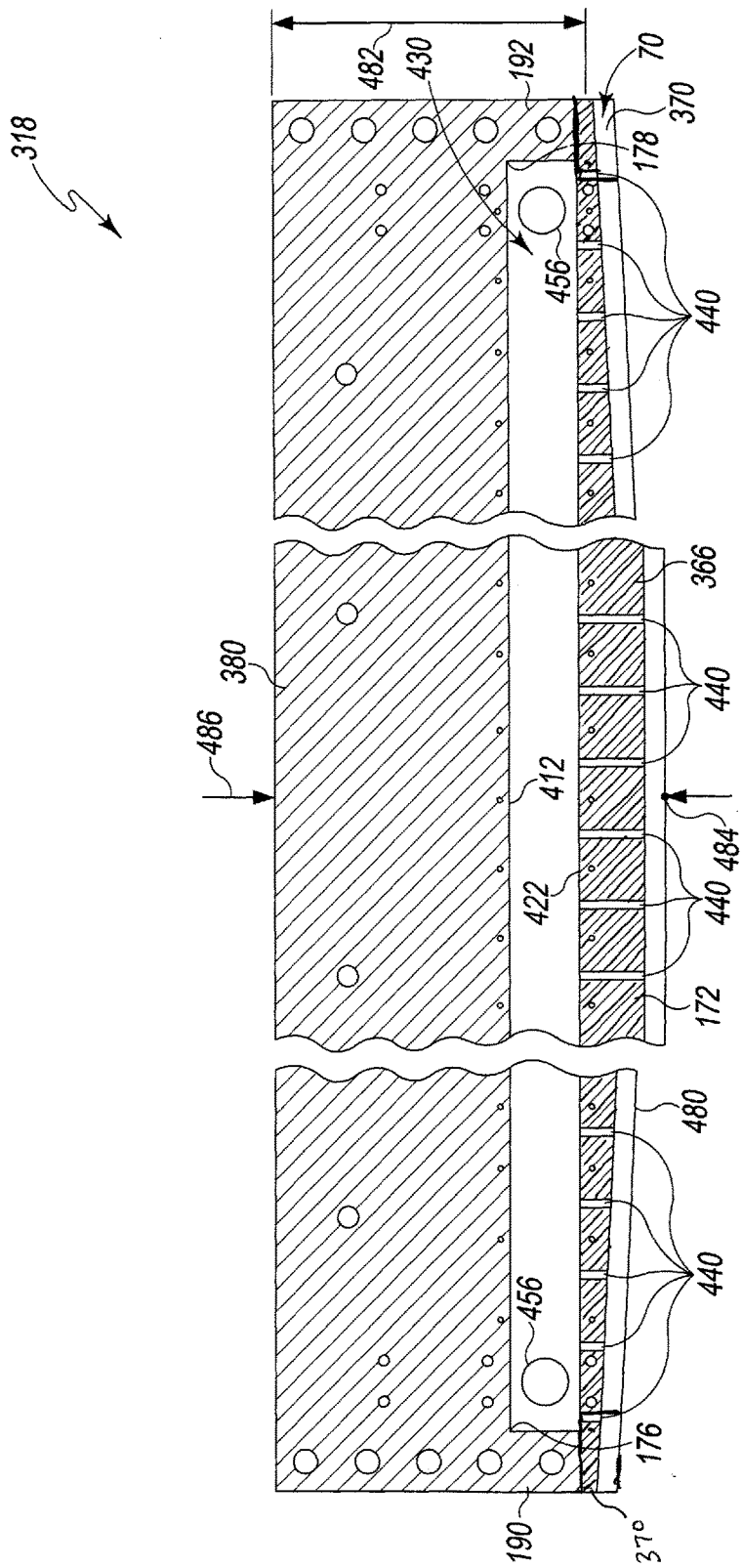
FIG. 11 is a cross-sectional view taken along the line 11-11 in FIG. 8 of the guide assembly.

As shown in FIG. 11, the channel 430 has a substantially constant area along its length. In other words, unlike the embodiment of FIGS. 1-6, the channel 430 has a constant height or depth. In other embodiments, the channel 430 may have a varying cross-section like the channel 76. Additionally, in other embodiments, the channel 430 may be tapered like the channel 76 of the embodiment of FIGS. 1-6 to direct fluid downward toward the center of the guide assembly 318.

As shown in FIG. 11, the longitudinal channel 430 is closed at each of its ends 176, 178. In the illustrative embodiment, the guide assembly 318 includes a section 190 of the plate 380 that closes the end 176 of the channel 430. The opposite end 178 of the channel 430 is closed by another section 192 of the plate 380. In other embodiments, the ends of the channel 430 may be closed by blocks that are welded to the plate 380 and strip 366. The ends may also be closed by portions of the strip 366. In still other embodiments, plastic inserts may be used to close the channel 430. It should also be appreciated that in other embodiments the ends of the channel 430 may be open.

The wear strip 366 includes a plurality of passageways 440 that open into the channel 430. Each passageway 440 extends vertically through the lower section 372 of the wear strip 366 from the channel 430 to the lower longitudinal slot 70. Fluid advanced from the fluid manifolds 382 and along the channel 430 may move down each passageway 440. The fluid may exit the passageways 440 into the slot 70 defined in the bottom of the wear strip 366 and flow over the cutting belt 20. As such, when the belt 20 is driven by the sheaves 22, fluid may be passed over the belt 20 to lubricate the belt 20 (and block 12) during a cutting operation.

As described above, the guide assembly 318 also includes a number of fluid manifolds 382 that are attached to the monolithic metallic plate 380. In the illustrative embodiment, the guide assembly 318 includes a pair of fluid manifolds 382—one positioned at each of the ends 362, 364, as shown in FIG. 10. In the illustrative embodiment, each of the fluid manifolds 382 has substantially the same configuration. Each fluid manifolds 382 includes a metallic body 450 that is secured to the monolithic metallic plate 380 via a number of fasteners 452. In other embodiments, the body 450 may be secured to the monolithic metallic plate 380 welding or other fastening means. Each body 450 has an opening 156 is defined in its distal surface 454, and a cylindrical inner wall 158 extends inwardly from the opening 156. In the illustrative embodiment, a plurality of threads 160 are defined in the inner wall 158 and are configured to receive a hose connector 162 of the device 10. The cylindrical inner wall 158 defines a passageway 164 through the manifold 382.

As shown in FIG. 11, the passageway 164 is aligned with an opening 456 defined in the plate 380. The passageway 164 and the opening 456 cooperate to permit fluid to be advanced from the connector 162 of the device 10 to the channel 430 (and hence to the cutting belt 20 via the passageways 440). A gasket or other seal (not shown) is positioned around the interface between the passageway 164 and the opening 456 to prevent leakage of fluid. It should be appreciated that in other embodiments the guide assembly 318 may include fluid ports similar to ports 140, 142, 262 described above in reference to FIGS. 1-7.

As shown in FIG. 8, the wear strip 366 includes an opening 460 that is defined in the upper flange 374. In the illustrative embodiment, the opening 460 is aligned with the opening 456 of the plate 380. Additionally, the wear strip 366 includes one opening 460 at each end 362, 364 of the guide assembly 318. A cover plate 462 is positioned over each opening 460 to seal the opening 460 and thereby prevent leakage. It should be appreciated that additional fluid manifolds 382 might be positioned over the opening 460. Additionally, in some devices 10, the fluid manifolds 382 may attached to the guide assembly 318 only at the openings 460, while cover plates 462 are positioned over the openings 456 of the plate 380.

As shown in FIGS. 10-11, the bottom surface 480 of the wear strip 366 defines a downwardly-extending arc such that the guide assembly 318 is taller between its ends 362, 364. In the illustrative embodiment, the bottom surface 480 is the bottom end of the assembly 318. As shown in FIG. 11, the guide assembly 318 has a height 482 defined between the bottom surface 480 of the wear strip 366 and the top wall 94 of the plate 380 at each of the ends 362, 364. In the illustrative embodiment, the height 482 is equal to about 9.5 inches. The bottom surface 480 has a low peak 484 positioned between the ends 362, 364 that defines another height 486 of the guide assembly 318. In the illustrative embodiment, the height 486 is about 10.5 inches. It should be appreciated that in other embodiments the height of the guide assembly 318 may vary depending on such factors as the configuration of the device 10 and the length of the guide assembly 318.

In use, the wear strip 366 may be attached to the monolithic metallic plate 380. To do so, the upper flange 374 of the wear strip 366 may be aligned with and then inserted into the groove 414 defined in the plate 380, while the lower flange 404 of the plate 380 is aligned with and inserted into the groove 424 defined in the wear strip 366. The fasteners 78 may be advanced into the through holes 136 defined in the plate 380 and wear strip 366 to secure the wear strip 366 to the plate 380. In that way, the guide bar assembly 318 may be formed and the fluid channel 430 defined.

The guide bar assembly 318 may be attached to the frame 16 in a manner similar to that described above in reference to guide bar assembly 18. To do so, one end 362 is aligned with the mounting bracket 202 (see FIG. 8) of the frame 16 and the opposite end 364 may be aligned with another bracket 202. The ends 362, 364 may then be positioned in the mounting brackets 202 and fasteners 108 advanced through the brackets 202 and each of the bores 104, 106 to secure the guide bar assembly 318. The cutting belt 20 may be positioned in the guide slot 70 of the wear strip 366, and the hose connector 162 of the device 10 may be attached to the fluid ports 382.

In operation, a block 12 is positioned below the frame 16 on the platform 14. The motor may be energized to rotate the sheaves 22 such that the belt 20 is pulled in the direction indicated by arrow 30 in FIGS. 1 and 2 as the frame 16 is lowered by the lift mechanism 32. As described above, the belt 20 may be advanced into contact with the block 12, and the guide assembly 18 directs the belt 20 to remove material from the block 12 along a substantially straight line 40. As shown in FIG. 8, the width 210 of the straight line 40 corresponds to the amount of material removed by the belt 20. In the illustrative embodiment, the width 210 is less than or equal to about 0.370 inches. The width 210 may be in a range of about 0.340 inches to 0.370 inches.

Fluid is advanced from the device 10 through the connectors 162 and the fluid ports 382, along the channel 430 of the guide bar assembly 318, and down each passageway 440 of the wear strip 366. Fluid exits the passageways 440 into the slot 70 and advances over the cutting belt 20. As such, as the belt 20 is driven by the sheaves 22, fluid is passed over the belt 20 to lubricate the belt 20 (and block 12) during the cutting operation.

While the disclosure has been illustrated and described in detail in the drawings and foregoing description, such an illustration and description is to be considered as exemplary and not restrictive in character, it being understood that only illustrative embodiments have been shown and described and that all changes and modifications that come within the spirit of the disclosure are desired to be protected.

There are a plurality of advantages of the present disclosure arising from the various features of the method, apparatus, and system described herein. It will be noted that alternative embodiments of the method, apparatus, and system of the present disclosure may not include all of the features described yet still benefit from at least some of the advantages of such features. Those of ordinary skill in the art may readily devise their own implementations of the method, apparatus, and system that incorporate one or more of the features of the present invention and fall within the spirit and scope of the present disclosure as defined by the appended claims.

The invention claimed is:

1. A device for cutting a block of stone, the device comprising:
    a platform configured to receive the block of stone,
    a frame configured to move vertically relative to the platform,
    a guide bar assembly having a first longitudinal side and a second longitudinal side, the guide bar assembly comprising:
        a monolithic metallic plate, the monolithic metallic metal plate including an upper section and a lower flange extending downwardly from the upper section on the first longitudinal side of the guide bar assembly, and
        a wear bar including (i) a lower section secured to the lower flange of the monolithic metallic plate, the lower section including a lower longitudinal slot, and (ii) an upper flange extending upwardly from the lower section on the second longitudinal side of the guide bar assembly, the upper flange being secured to the upper section of the monolithic metallic plate,
    a fastener extending through each bore of a plurality of bores extending through the guide bar assembly to secure the guide bar assembly to the frame, and
    a cutting belt positioned in the lower longitudinal slot of the wear bar and including a downward-facing cutting surface,
    wherein the lower flange of the monolithic metallic plate is spaced apart from the upper flange of the wear bar, and the lower flange of the monolithic metallic plate and the upper flange of the wear bar cooperate to define a longitudinal channel in the guide bar assembly.

2. The device of claim 1, wherein the wear bar includes a plurality of passageways extending through the lower section to fluidly connect the longitudinal channel to the lower longitudinal slot.

3. The device of claim 2, wherein the guide bar assembly includes a fluid port having a passageway connected to the longitudinal channel.

4. The device of claim 1, wherein the longitudinal channel is closed at each end.

5. The device of claim 4, wherein the guide bar assembly includes a first steel block and a second steel block secured to the monolithic metallic plate, the first steel block defining a first closed end of the longitudinal channel and the second steel block defining a second closed end of the longitudinal channel.

6. The device of claim 1, wherein the monolithic metallic plate has:
- a length defined between a first end wall and a second end wall, and
- a width defined between the first side wall and the second side wall, the width being equal to about 0.25 inches along the length of the monolithic metallic plate.

7. The device of claim 6, wherein the length of the monolithic metallic plate is in a range of 90 inches to 185 inches.

8. The device of claim 7, wherein the cutting belt has a maximum width of about 0.325 inches.

9. The device of claim 1, wherein a groove is defined in the lower section of the wear bar, the groove being sized to receive a tip of the lower flange of the monolithic metallic plate.

10. The device of claim 9, wherein a fastener extends through the tip of the lower flange and the lower section to secure the wear bar to the monolithic metallic plate.

11. The device of claim 1, wherein a groove is defined in the upper section of the monolithic metallic plate, the groove being sized to receive a tip of the upper flange of the wear bar.

12. The device of claim 11, wherein a fastener extends through the tip of the upper flange and the upper section to secure the wear bar to the monolithic metallic plate.

* * * * *